(12) United States Patent
Koide

(10) Patent No.: US 12,234,183 B2
(45) Date of Patent: *Feb. 25, 2025

(54) OPTICAL GLASS, AND OPTICAL ELEMENT, CEMENTED LENS, OPTICAL SYSTEM, INTERCHANGEABLE LENS FOR CAMERA AND OPTICAL DEVICE USING SAME

(71) Applicant: NIKON CORPORATION, Tokyo (JP)

(72) Inventor: Tetsuya Koide, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,534

(22) Filed: Jun. 23, 2023

(65) Prior Publication Data

US 2023/0348316 A1  Nov. 2, 2023

Related U.S. Application Data

(63) Continuation of application No. 16/859,365, filed on Apr. 27, 2020, now Pat. No. 11,724,959, which is a continuation of application No. PCT/JP2018/016041, filed on Apr. 18, 2018.

(30) Foreign Application Priority Data

Oct. 27, 2017 (JP) .................................. 2017-208104

(51) Int. Cl.
| | |
|---|---|
| *C03C 3/17* | (2006.01) |
| *C03C 3/19* | (2006.01) |
| *C03C 3/21* | (2006.01) |
| *G02B 1/00* | (2006.01) |
| *G03B 17/14* | (2021.01) |

(52) U.S. Cl.
CPC .................. *C03C 3/17* (2013.01); *C03C 3/19* (2013.01); *C03C 3/21* (2013.01); *G02B 1/00* (2013.01); *G03B 17/14* (2013.01)

(58) Field of Classification Search
CPC .... C03C 3/17; C03C 3/19; C03C 3/21; G02B 1/00; G02B 17/14
See application file for complete search history.

(56) References Cited

U.S. PATENT DOCUMENTS

| | | | |
|---|---|---|---|
| 3,328,181 A | 6/1967 | Weidel | |
| 4,108,673 A | 8/1978 | Toratani | |
| 4,261,751 A | 4/1981 | Nakamura | |
| 11,724,959 B2 * | 8/2023 | Koide | G02B 1/00 501/46 |
| 2012/0177914 A1 | 7/2012 | Igari | |
| 2016/0304390 A1 | 10/2016 | Mikami | |
| 2020/0181001 A1 | 6/2020 | Aitken | |

FOREIGN PATENT DOCUMENTS

| | | |
|---|---|---|
| FR | 2 504 515 | 10/1982 |
| JP | 46-003462 | 1/1971 |
| JP | 46-3462 | 1/1971 |
| JP | 63-265840 | 11/1988 |
| JP | 3-83836 | 4/1991 |
| JP | 11-139847 | 5/1999 |
| JP | 2001031446 A | 2/2001 |
| JP | 2006-219365 | 8/2006 |
| JP | 2011-73934 | 4/2011 |
| WO | 2015/093280 | 6/2015 |

OTHER PUBLICATIONS

Extended European Search Report dated Apr. 19, 2024 for counterpart European Application No. 24165287.4.
International Search Report mailed Jul. 17, 2018, in corresponding International Patent Application No. PCT/JP2018/016041.
Ogawa, Hiroshi, Ogawa, Shin' ei eds. "7. Optical Glass" in Data Book of Glass Composition (1991). Glass Manufactures' Association of Japan, Mar. 25, 1991, pp. 83-108, in particular, TiF6.
Extended European Search Report dated Jul. 16, 2021, for European Application No. 18871384.
Office Action dated Jan. 11, 2022, in Japanese Application No. 2019-549822.
Office Action dated Nov. 3, 2021, in Chinese Application No. 201880067237.8.
Office Action, dated Jul. 6, 2022, in counterpart Chinese Patent Application No. 201880067237.8 (14 pp.).
Chinese Office Action dated Jan. 28, 2023 in counterpart Chinese Application No. 201880067237.8.
Japanese Office Action dated May 30, 2023 for Japanese Application No. 2022-142347.
U.S. Office Action dated May 27, 2022 for U.S. Appl. No. 16/859,365.
U.S. Notice of Allowance dated May 27, 2022 for U.S. Appl. No. 16/859,365.
U.S. Appl. No. 16/859,365, filed Apr. 27, 2020, Tetsuya Koide, Nikon Corporation.

* cited by examiner

*Primary Examiner* — Elizabeth A. Bolden

(57) ABSTRACT

An optical glass contains: a $P_2O_5$ component of 30 to 60 mass % (exclusive of 30); an $Al_2O_3$ component of 2 to 10 mass % (exclusive of 2); a $TiO_2$ component of 10 to 36 mass % (exclusive of 36); an $Nb_2O_5$ component of 0 to 5 mass %; a $Ta_2O_5$ component of 0 to 15 mass %; a $Bi_2O_3$ component of 0 to 5 mass % (exclusive of 5); and an $Sb_2O_3$ component of 0 to 1 mass %; and a BaO component of 1 to 20 mass %.

18 Claims, 5 Drawing Sheets

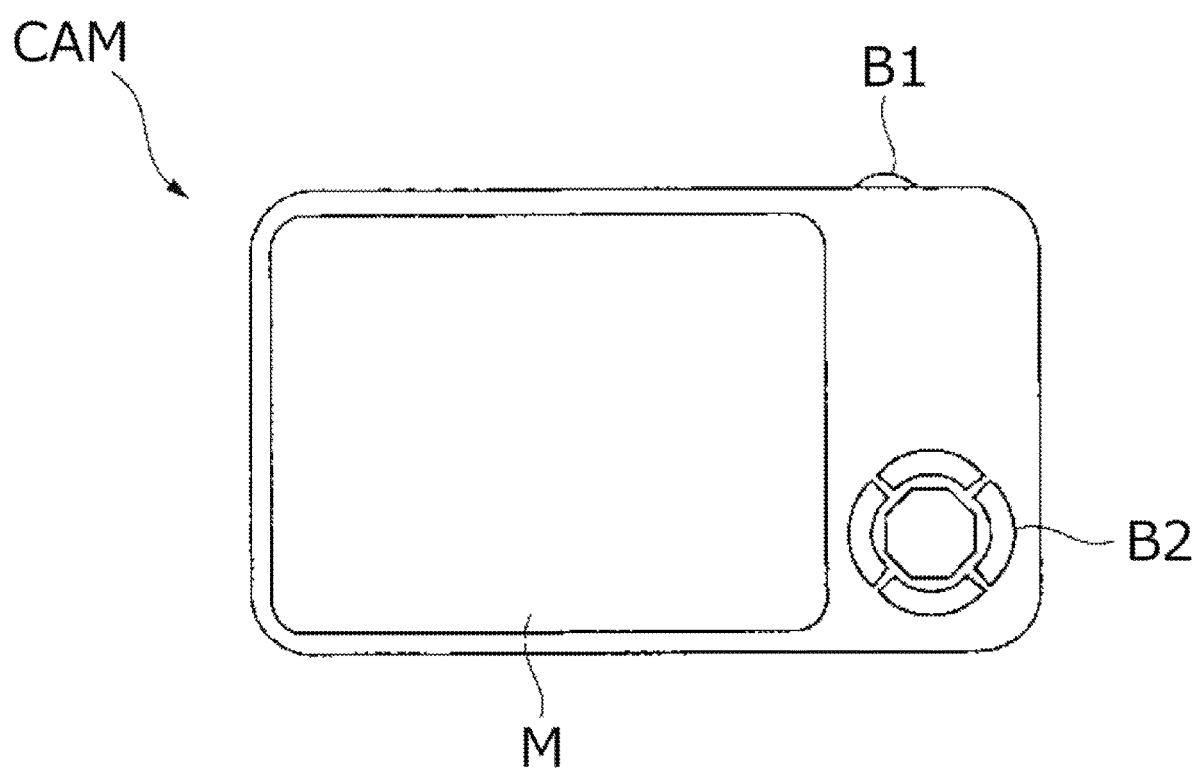

OPTICAL GLASS, AND OPTICAL ELEMENT, CEMENTED LENS, OPTICAL SYSTEM, INTERCHANGEABLE LENS FOR CAMERA AND OPTICAL DEVICE USING SAME

CROSS REFERENCE TO RELATED APPLICATIONS

This application is a Continuation Application of U.S. application Ser. No. 16/859,365, filed on Apr. 27, 2020, which is a Continuation Application, under 35 U.S.C. § 111(a), of International Patent Application No. PCT/JP2018/016041, filed on Apr. 18, 2018, which claims foreign priority benefit under 35 U.S.C. § 119 of Japanese Patent Application No. 2017-208104 filed on Oct. 27, 2017 in the Japanese Intellectual Property Office, the contents of each of which are incorporated herein by reference.

TECHNICAL FIELD

The present invention relates to an optical glass, an optical element, a cemented lens, an optical system, an interchangeable lens for camera, and an optical device.

BACKGROUND ART

In recent years, imaging devices or the like having an image sensor with a large number of pixels have been developed, and an optical glass having high dispersion and low specific gravity are demanded as an optical glass used in such devices.

CITATION LIST

Patent Literature

Patent Literature 1: JP 2006-219365 A

SUMMARY OF INVENTION

A first aspect according to the present invention is an optical glass including: a $P_2O_5$ component of 30 to 60 mass % (exclusive of 30); an $Al_2O_3$ component of 2 to 10 mass % (exclusive of 2); a $TiO_2$ component of 10 to 36 mass % (exclusive of 36); an $Nb_2O_5$ component of 0 to 5 mass %; a $Ta_2O_5$ component of 0 to 15 mass %; a $Bi_2O_3$ component of 0 to 5 mass % (exclusive of 5); and an $Sb_2O_3$ component of 0 to 1 mass %; and a BaO component of 1 to 20 mass %.

A second aspect according to the present invention is an optical element including the optical glass described above.

A third aspect according to the present invention is an optical device including the optical element described above.

A fourth aspect according to the present invention is a cemented lens including a first lens element and a second lens element, wherein at least one of the first lens element and the second lens element includes the optical glass described above.

A fifth aspect according to the present invention is an optical system including the cemented lens described above.

A sixth aspect according to the present invention is an interchangeable lens for camera including the optical system described above.

A seventh aspect according to the present invention is an optical device including the optical system described above.

BRIEF DESCRIPTION OF DRAWINGS

FIGS. 2A and 2B are schematic diagrams illustrating another example in which the optical device according to the present embodiment is an imaging device.

DESCRIPTION OF EMBODIMENTS

Figure 1:
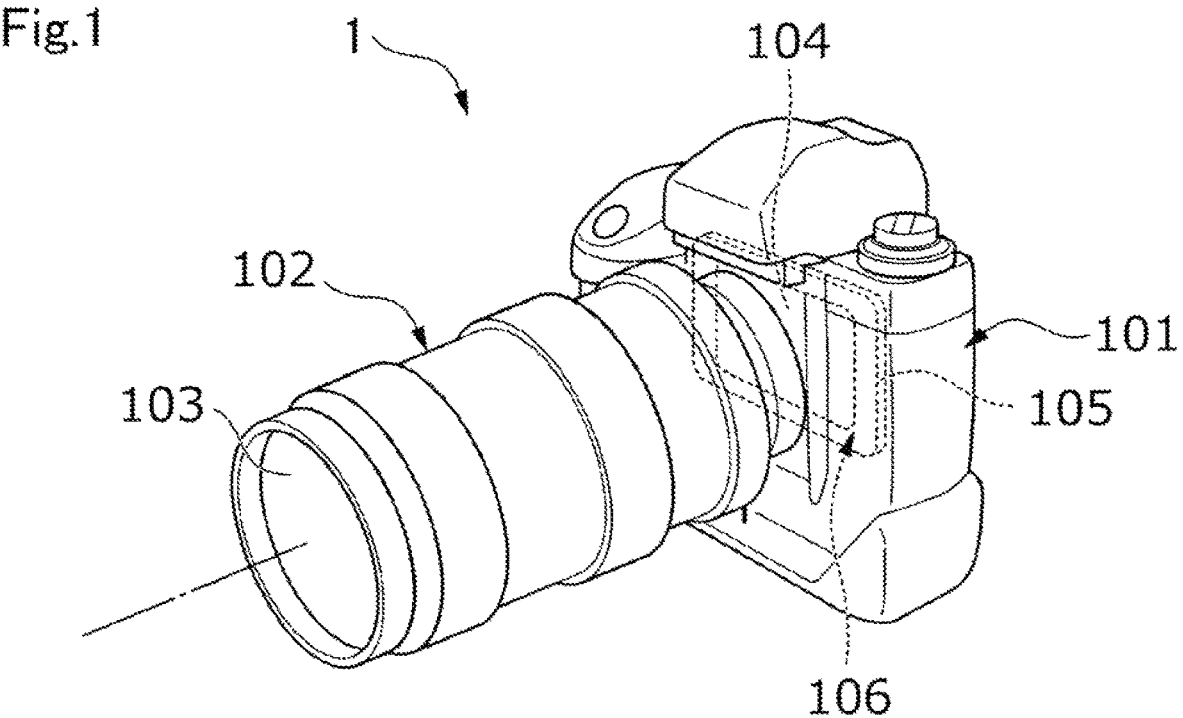
FIG. 1 is a perspective view illustrating an example in which an optical device according to the present embodiment is an imaging device.

Hereinafter, an embodiment according to the present invention (hereinafter, referred to as "the present embodiment") will be described in details. The following present embodiments are examples for describing the present invention, and are not intended to limit the present invention to the following description. The present invention may be appropriately modified within the scope of the gist thereof.

Herein, unless specified otherwise, it is assumed that all the content of each component refers to a mass % (mass percentage) with respect to a total weight of the glass in terms of oxide-equivalent composition. Note that the oxide-equivalent composition herein refers to a composition obtained by expressing each component contained in the glass by setting a total mass of the oxides to 100 mass %, assuming that all of oxides, composite salts, or the like used as raw materials of the glass constituents according to the present embodiment are decomposed at the time of melting and are changed into oxides.

The optical glass according to the present embodiment contains a $P_2O_5$ component of 30 to 60 mass % (exclusive of 30), an $Al_2O_3$ component of 2 to 10 mass % (exclusive of 2), a $TiO_2$ component of 10 to 36 mass % (exclusive of 36), an $Nb_2O_5$ component of 0 to 5 mass %, a $Ta_2O_5$ component of 0 to 15 mass %, a $Bi_2O_3$ component of 0 to 5 mass % (exclusive of 5), and an $Sb_2O_3$ component of 0 to 1 mass %.

In the related art, in order to achieve higher dispersibility, a technique of increasing the content of the component such as $TiO_2$ or $Nb_2O_5$ has been tested. However, if the content of such a component increases, transmittance tends to decrease, and specific gravity tends to increase. In this regard, the optical glass according to the present embodiment can reduce the specific gravity while achieving higher dispersibility (smaller Abbe number). Therefore, it is possible to implement a lightweight lens advantageous in aberration correction.

$P_2O_5$ is a component that forms a glass structure, improves devitrification resistance, and decreases the refractive index and the chemical durability. If the content of $P_2O_5$ is too small, devitrification tends to easily occur. If the content of $P_2O_5$ is too large, the refractive index and the chemical durability tend to decrease. From such a viewpoint, the content of $P_2O_5$ is set to 30 to 60% (exclusive of 30), preferably 35 to 50%, and more preferably 40 to 50%. By setting the content of $P_2O_5$ within such a range, it is possible to increase the devitrification resistance and obtain the higher refractive index while improving the chemical durability.

$Al_2O_3$ is a component that improves the chemical durability and decreases the partial dispersion ratio. If the content of $Al_2O_3$ is too small, the chemical durability tends to decrease. If the content of $Al_2O_3$ is too large, the partial dispersion ratio tends to decrease. From such a viewpoint, the content of $Al_2O_3$ is set to 2 to 10% (exclusive of 2), preferably 2 to 9% (exclusive of 2), and more preferably 2 to 8%. By setting the content of $Al_2O_3$ within such a range, it is possible to increase the chemical durability and prevent the partial dispersion ratio from decreasing.

$TiO_2$ is a component that increases the refractive index and the partial dispersion ratio and decreases the transmittance. If the content of $TiO_2$ is too small, the refractive index and the partial dispersion ratio tend to decrease. If the content of $TiO_2$ is too large, the transmittance tends to degrade. In addition, in the related art, a technique of increasing the content of $TiO_2$ or the like has been used to obtain higher dispersibility. However, it is not necessary to increase the content of $TiO_2$ in the optical glass according to the present embodiment. From such a viewpoint, the content of $TiO_2$ is set to 10 to 36% (exclusive of 36), preferably 15 to 30%, and more preferably 17 to 25%. By setting the content of $TiO_2$ within such a range, it is possible to implement high transmittance without decreasing the refractive index and the partial dispersion ratio.

$Nb_2O_5$ is a component that increases the refractive index and dispersion and decreases the transmittance. If the content of $Nb_2O_5$ is small, the refractive index tends to decrease. In addition, if the content of $Nb_2O_5$ is large, the transmittance tends to degrade. In the related art, a technique of increasing the content of $Nb_2O_5$ has been used to implement higher dispersibility. However, it is not necessary to increase the content of $Nb_2O_5$ in the optical glass according to the present embodiment. From such a viewpoint, the content of $Nb_2O_5$ is set to 0 to 5%, preferably 0 to 3%, more preferably 0 to 2%. Further preferably, $Nb_2O_5$ is not substantially contained.

Herein, "being not substantially contained" means that the corresponding component is not contained as a component affecting the property of the glass composition over a concentration inevitably contained as an impurity. For example, if the content is approximately 100 ppm, it is considered that the content is not substantially contained.

$Ta_2O_5$ is a component that increases the refractive index and dispersion and decreases the devitrification stability. If the content of $Ta_2O_5$ is large, the devitrification stability tends to degrade. From such a viewpoint, the content of $Ta_2O_5$ is set to 0 to 15%, preferably 0 to 10%, more preferably 0 to 5%. Further preferably, Ta is not substantially contained. Using the optical glass according to the present embodiment, it is possible to reduce the content of $Ta_2O_5$, which is expensive raw material. In addition, since $Ta_2O_5$ may not be contained, it is excellent in terms of cost of the raw material.

$Bi_2O_3$ is a component that increases the refractive index and dispersion and decreases the transmittance. If the content of $Bi_2O_3$ is large, the transmittance tends to degrade. From such a viewpoint, the content of $Bi_2O_3$ is set to 0 to 5% (exclusive of 5), preferably 0 to 3%, and more preferably 0 to 2%.

From the viewpoint of defoamability at the time of glass melting, the content of $Sb_2O_3$ is set to 0 to 1%, preferably 0 to 0.5%, and more preferably 0 to 0.2%.

As an optional component, the optical glass according to the present embodiment may further contain at least one selected from a group consisting of $Li_2O$, $Na_2O$, $K_2O$, BaO, ZnO, MgO, CaO, SrO, $SiO_2$, $B_2O_3$, $WO_3$, $ZrO_2$, $Y_2O_3$, $La_2O_3$, or $Gd_2O_3$.

From the viewpoint of meltability, the content of $Li_2O$ is preferably 0 to 20%, more preferably 0 to 15%, and further preferably 0 to 10%.

$Na_2O$ is a component that improves the meltability and decreases the refractive index. If the content of $Na_2O$ is too small, the meltability tends to decrease. If the content of $Na_2O$ is too large, the refractive index and the chemical durability tend to decrease. From such a viewpoint, the content of $Na_2O$ is preferably set to 0 to 30%, more preferably 10 to 25%, and further preferably 10 to 20%. By setting the content of $Na_2O$ within such a range, it is possible to improve the meltability and prevent the refractive index and the chemical durability from decreasing.

$K_2O$ is a component that improves the meltability and decreases the refractive index. If the content of $K_2O$ is too small, the meltability tends to decrease. If the content of $K_2O$ is too large, the refractive index and the chemical durability tend to decrease. From such a viewpoint, the content of $K_2O$ is preferably set to 0 to 30%, more preferably 3 to 25%, and further preferably 3 to 15%. By setting the content of $K_2O$ within such a range, it is possible to improve the meltability and prevent the refractive index and the chemical durability from decreasing.

The total amount of $Li_2O$, $Na_2O$, and $K_2O$ ($\Sigma R_2O$; where R=Li, Na, or K) is preferably set to 10 to 35%, more preferably 15 to 33%, further preferably 20 to 30% from the viewpoint of the meltability, the refractive index, and the chemical durability.

BaO is a component that improves the partial dispersion ratio and decreases the devitrification stability. If the content of BaO is too small, the partial dispersion ratio tends to decrease. If the content of BaO is too large, the devitrification stability tends to decrease. From such a viewpoint, the content of BaO is preferably set to 0 to 20%, more preferably 0 to 15%, and further preferably 1 to 8%. By setting the content of BaO within such a range, it is possible to increase the partial dispersion ratio and prevent the devitrification stability from decreasing.

ZnO is a component that improves the devitrification stability and decreases the partial dispersion ratio. If the content of ZnO is too small, the devitrification stability tends to decrease. If the content of ZnO is too large, the partial dispersion ratio tends to decrease. From such a viewpoint, the content of ZnO is preferably set to 0 to 20%, more preferably 0 to 15%, and further preferably 1 to 8%. By setting the content of ZnO within such a range, it is possible to improve the devitrification stability and prevent the partial dispersion ratio from decreasing.

From the viewpoint of higher dispersibility, the content of MgO is preferably set to 0 to 20%, more preferably 0 to 15%, and further preferably 0 to 10%.

From the viewpoint of higher dispersibility, the content of CaO is preferably set to 0 to 20%, more preferably 0 to 15%, and further preferably 0 to 10%.

From the viewpoint of higher dispersibility, the content of SrO is preferably set to 0 to 20%, more preferably 0 to 15%, and further preferably 0 to 10%.

From the viewpoint of meltability, the content of $SiO_2$ is preferably set to 0 to 10%, more preferably 0 to 7%, and further preferably 0 to 5%.

From the viewpoint of higher dispersibility, the content of $B_2O_3$ is preferably set to 0 to 20%, more preferably 0 to 15%, and further preferably 0 to 10%.

From the viewpoint of transmittance, the content of $WO_3$ is preferably set to 0 to 15%, more preferably 0 to 10%, and further preferably 0 to 7%.

From the viewpoint of meltability, the content of $ZrO_2$ is preferably set to 0 to 10%, more preferably 0 to 7%, and further preferably 0 to 3%.

From the viewpoint of meltability, the content of $Y_2O_3$ is preferably set to 0 to 15%, more preferably 0 to 10%, and further preferably 0 to 7%.

From the viewpoint of meltability, the content of $La_2O_3$ is preferably set to 0 to 10%, more preferably 0 to 7%, and further preferably 0 to 5%. From the viewpoint of cost, it is still more preferable that $La_2O_3$ is not substantially contained.

Since $Gd_2O_3$ is expensive raw material, its content is preferably set to 0 to 20%, more preferably 0 to 15%, and further preferably 0 to 7%.

A desirable combination of these contents includes an $Li_2O$ component of 0 to 20%, an $Na_2O$ component of 0 to 30%, and a $K_2O$ component of 0 to 30%. By setting such a combination, it is possible to improve meltability and prevent chemical durability from decreasing.

Another desirable combination includes a BaO component of 0 to 20%, a ZnO component of 0 to 20%, an MgO component of 0 to 20%, a CaO component of 0 to 20%, and an SrO component of 0 to 20%. Using such a combination, it is possible to increase the partial dispersion ratio and prevent dispersibility from decreasing.

Still another desirable combination includes an $SiO_2$ component of 0 to 10% and a $B_2O_3$ component of 0 to 20%. Using such a combination, it is possible to improve meltability and prevent dispersibility from decreasing.

Furthermore, the optical glass according to the present embodiment preferably satisfies the following relationship.

The content ratio of $TiO_2$ with respect to $P_2O_5$ ($TiO_2/P_2O_5$) is preferably set to 0.3 to 0.8, more preferably 0.3 to 0.7, and further preferably 0.3 to 0.6. By setting the ratio $TiO_2/P_2O_5$ within such a range, it is possible to increase the partial dispersion ratio.

The content ratio of $TiO_2$ with respect to $Al_2O_5$ ($TiO_2/Al_2O_5$) is preferably set to 2 to 16, more preferably 2 to 10, and further preferably 2 to 8. By setting the ratio $TiO_2/Al_2O_5$ within such a range, it is possible to increase the partial dispersion ratio.

In addition, if necessary, for the purpose of clarification, coloring, decoloring, fine adjustment of optical constants, or the like, a suitable amount of components such as a clarifier, a coloring agent, a defoaming agent, and a fluorine compound known in the art may be added to the glass composition. Furthermore, in addition to the components described above, other components may also be added as long as the effect of the optical glass according to the present embodiment can be obtained.

A method of manufacturing the optical glass according to the present embodiment is not particularly limited, and any method known in the art may be employed. In addition, a suitable manufacturing condition may be appropriately selected. For example, a manufacturing method may be employed, in which raw materials such as oxide, carbonate, nitrate, and sulfate are prepared at a target composition and are melted preferably at a temperature of 1100 to 1400° C., and more preferably 1200 to 1300° C., homogenization is performed by stirring, bubbles are removed, and molding is then performed by flowing them to a mold. A desired optical element may be obtained by fabricating the optical glass obtained in this manner into a desired shape through a reheat press or the like, as necessary, and performing polishing or the like.

As the raw material, it is preferable to use a high-purity product having a low impurity content. The high-purity product contains the corresponding component of 99.85 mass % or more. The use of the high-purity product reduces the amount of the impurity. As a result, the internal transmittance of the optical glass tends to increase.

Next, physical properties of the optical glass according to the present embodiment will be described.

From the viewpoint of reducing the thickness of the lens, it is desirable that the optical glass according to the present embodiment has a high refractive index (a refractive index ($n_d$) is large). However, in general, the specific gravity tends to increase as the refractive index ($n_d$) increases. On the basis of such a fact, the refractive index ($n_d$) of the optical glass according to the present embodiment with respect to the d-line is preferably within a range of 1.60 to 1.75, and more preferably 1.64 to 1.73.

The Abbe number ($v_d$) of the optical glass according to the present embodiment is preferably within a range of 20 to 35 and more preferably 22 to 30. As a desirable combination of the refractive index ($n_d$) and the Abbe number ($v_d$) in the optical glass according to the present embodiment, the refractive index ($n_d$) with respect to the d-line is 1.60 to 1.75, and the Abbe number ($v_d$) is 20 to 35. For example, by combining the optical glass according to the present embodiment having such properties with other optical glasses, it is possible to design an optical system capable of successfully correcting chromatic aberration or other aberrations.

From the viewpoint of reducing the weight of the lens, the optical glass according to the present embodiment desirably has a low specific gravity. However, in general, the refractive index tends to decrease as the specific gravity increases. On the basis of such a fact, a desirable specific gravity ($S_g$) of the optical glass according to the present embodiment is within a range of 2.9 to 3.6, in which "2.9" is the lower limit, and "3.6" is the upper limit.

From the viewpoint of aberration correction of the lens, the optical glass according to the present embodiment desirably has a large partial dispersion ratio ($P_{g,F}$). On the basis of such as fact, the lower limit of the partial dispersion ratio ($P_{g,F}$) of the optical glass according to the present embodiment is preferably 0.60 or greater, more preferably 0.61 or greater, and further preferably 0.62. In addition, the upper limit of the partial dispersion ratio ($P_{g,F}$) may be, for example, 0.66, but not limited thereto.

From the viewpoint of the fact described above, the optical glass according to the present embodiment may be suitably used, for example, as an optical element included in an optical device. Such an optical element includes a mirror, a lens, a prism, a filter, or the like, and can be widely used as an optical system. As a suitable example of the optical element, for example, an optical lens, an interchangeable lens for cameras, or the like may be included. In addition, these may be suitably used in imaging devices such as a lens-interchangeable camera or a non-lens-interchangeable camera, and various optical devices such as a multi-photon microscopic device. Hereinafter, such examples will be described.

<Imaging Device>

FIG. 1 is a perspective view illustrating an exemplary optical device according to the present embodiment as an imaging device. The imaging device 1 is a so-called digital single-lens reflex camera (lens-interchangeable camera), and a photographing lens 103 (optical system) includes an optical element based on the optical glass according to the present embodiment. A lens barrel 102 is detachably installed in a lens mount (not shown) of a camera body 101. In addition, the light passing through the lens 103 of the lens barrel 102 is focused on a sensor chip (solid-state imaging element) 104 of a multi-chip module 106 disposed on the back side of the camera body 101. The sensor chip 104 is a bare chip such as a so-called CMOS image sensor, and the multi-chip module 106 is, for example, a COG (chip on glass) type module in which the sensor chip 104 is mounted on a glass substrate 105 as a bare chip.

Figure 2A:
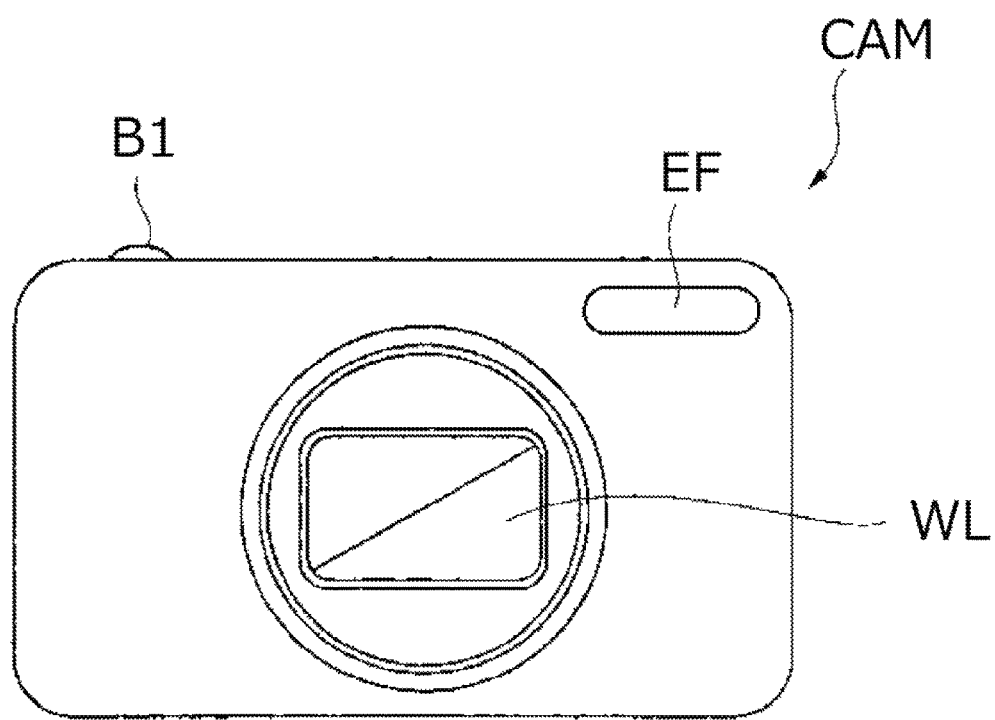

FIGS. 2A and 2B are schematic diagrams illustrating another example in which the optical device according to the present embodiment is used as an imaging device. FIG. 2A is a front view illustrating the imaging device CAM, and FIG. 2B is a rear view illustrating the imaging device CAM. The imaging device CAM is a so-called digital still camera (non-lens-interchangeable camera), and the photographing lens WL (optical system) includes an optical element based on the optical glass according to the present embodiment.

If a power button (not shown) of the imaging device CAM is pressed, a shutter (not shown) of the photographing lens WL is opened, and the light from a subject (object) is condensed by the photographing lens WL and focused on the imaging element arranged on the image plane. The subject image formed on the imaging element is displayed on a liquid crystal monitor M arranged behind the imaging device CAM. A photographer determines the arrangement of the subject image while looking at the liquid crystal monitor M, and then presses down a release button B1 to capture the subject image with the imaging element and record and save the image in a memory (not shown).

The imaging device CAM has an auxiliary light-emitting unit EF that emits auxiliary light when the subject is dark, a function button B2 or the like, used for setting various conditions of the imaging device CAM, or the like.

An optical system used in such a digital camera is required to have higher resolution, lighter weight, and smaller size. In order to satisfy such requirements, it is effective to use glasses having different dispersion characteristics in the optical system. In particular, there is a high demand for glasses having a lower specific gravity ($S_g$) while having high dispersibility. From such a viewpoint, the optical glass according to the present embodiment is suitable as a member of such optical instrument. Note that the optical instrument applicable to the present embodiment is not limited to the imaging device described above, but may include, for example, a projector or the like. The optical element is not limited to a lens, but may include, for example, a prism or the like.

<Multi-Photon Microscope>

Figure 3:
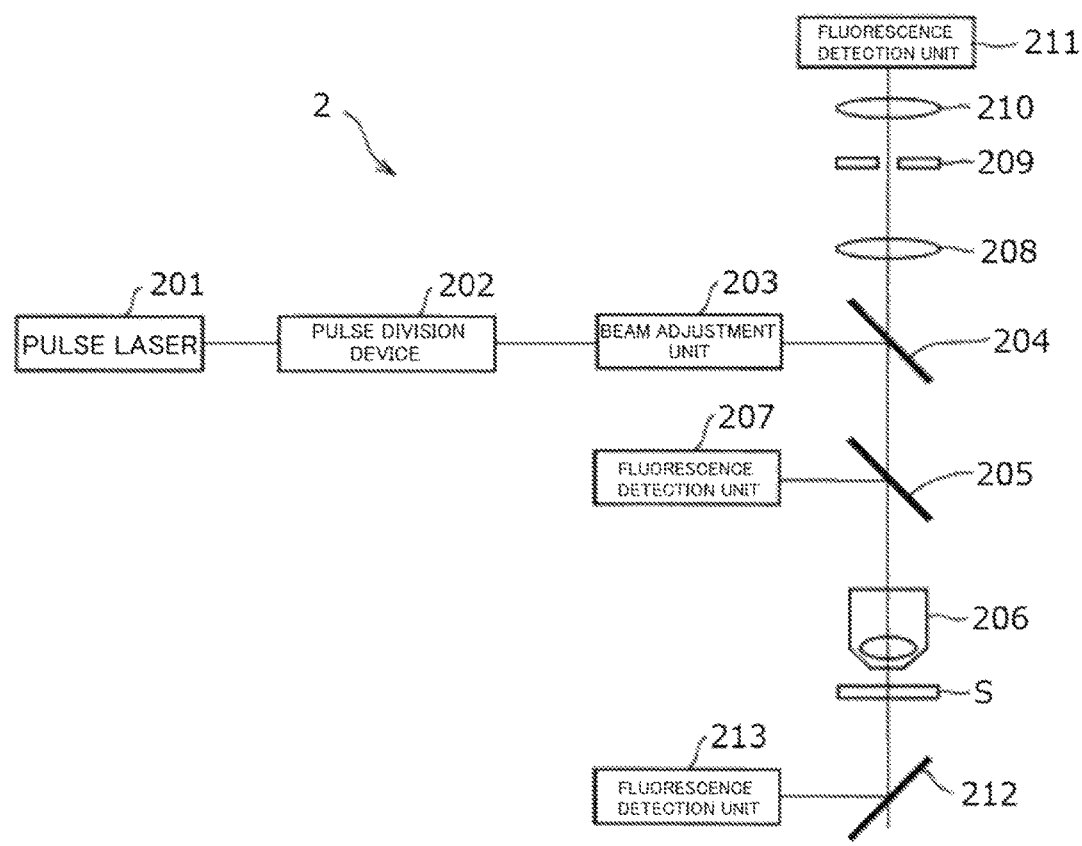
FIG. 3 is a block diagram illustrating an exemplary configuration of a multi-photon microscope according to the present embodiment.

FIG. 3 is a block diagram illustrating an example of a configuration of a multi-photon microscope 2 using the optical glass according to the present embodiment. The multi-photon microscope 2 includes an objective lens 206, a condensing lens 208, and an image forming lens 210. At least one of the objective lens 206, the condensing lens 208, and the image forming lens 210 includes an optical element using the optical glass according to the present embodiment as a mother material. Hereinafter, description is mainly made on the optical system of the multi-photon microscope 2.

A pulse laser device 201 emits ultrashort pulse light having, for example, a near infrared wavelength (approximately 1,000 nm) and a pulse width of a femtosecond unit (for example, 100 femtoseconds). In general, ultrashort pulse light immediately after being emitted from the pulse laser device 201 is linearly polarized light that is polarized in a predetermined direction.

A pulse division device 202 divides the ultrashort pulse light, increases a repetition frequency of the ultrashort pulse light, and emits the ultrashort pulse light.

A beam adjustment unit 203 has a function of adjusting a beam diameter of the ultrashort pulse light, which enters from the pulse division device 202, to a pupil diameter of the objective lens 206, a function of adjusting convergence and divergence angles of the ultrashort pulse light in order to correct chromatic aberration (a focus difference) on an axis of a wavelength of multi-photon excitation light emitted from a sample S and the wavelength of the ultrashort pulse light, a pre-chirp function (group velocity dispersion compensation function) providing inverse group velocity dispersion to the ultrashort pulse light in order to correct the pulse width of the ultrashort pulse light, which is increased due to group velocity dispersion at the time of passing through the optical system, and the like.

The ultrashort pulse light emitted from the pulse laser device 201 have a repetition frequency increased by the pulse division device 202, and is subjected to the above-mentioned adjustments by the beam adjustment unit 203. Furthermore, the ultrashort pulse light emitted from the beam adjustment unit 203 is reflected on a dichroic mirror 204 in a direction toward a dichroic mirror 205, passes through the dichroic mirror 205, is converged by the objective lens 206, and is radiated to the sample S. At this time, an observation surface of the sample S may be scanned with the ultrashort pulse light through use of scanning means (not illustrated).

For example, when the sample S is subjected to fluorescence observation, a fluorescent pigment by which the sample S is dyed is subjected to multi-photon excitation in an irradiated region with the ultrashort pulse light and the vicinity thereof on the sample S, and fluorescence having a wavelength shorter than an infrared wavelength of the ultrashort pulse light (hereinafter, also referred to "observation light") is emitted.

The observation light emitted from the sample S in a direction toward the objective lens 206 is collimated by the objective lens 206, and is reflected on the dichroic mirror 205 or passes through the dichroic mirror 205 depending on the wavelength.

The observation light reflected on the dichroic mirror 205 enters a fluorescence detection unit 207. For example, the fluorescence detection unit 207 is formed of a barrier filter, a photo multiplier tube (PMT), or the like, receives the observation light reflected on the dichroic mirror 205, and outputs an electronic signal depending on an amount of the light. Further, the fluorescence detection unit 207 detects the observation light over the observation surface of the sample S, in conformity with the ultrashort pulse light scanning on the observation surface of the sample S.

Meanwhile, the observation light passing through the dichroic mirror 205 is de-scanned by scanning means (not illustrated), passes through the dichroic mirror 204, is converged by the condensing lens 208, passes through a pinhole 209 provided at a position substantially conjugate to a focal position of the objective lens 206, passes through the image forming lens 210, and enters a fluorescence detection unit 211.

For example, the fluorescence detection unit 211 is formed of a barrier filter, a PMT, or the like, receives the observation light forming an image on a light formed by the image forming lens 210 on the reception surface of the fluorescence detection unit 211, and outputs an electronic signal depending on an amount of the light. Further, the fluorescence detection unit 211 detects the observation light over the observation surface of the sample S, in conformity with the ultrashort pulse light scanning on the observation surface of the sample S.

Note that all the observation light emitted from the sample S in a direction toward the objective lens 206 may be detected by the fluorescence detection unit 211 by excluding the dichroic mirror 205 from the optical path.

Further, the observation light emitted from the sample S in a direction opposite to the objective lens 206 is reflected on a dichroic mirror 212, and enters a fluorescence detection unit 213. The fluorescence detection unit 213 is formed of, for example, a barrier filter, a PMT, or the like, receives the observation light reflected on the dichroic mirror 212, and outputs an electronic signal depending on an amount of the light. Further, the fluorescence detection unit 213 detects the observation light over the observation surface of the sample S, in conformity with the ultrashort pulse light scanning on the observation surface of the sample S.

The electronic signals output from the fluorescence detection units 207, 211, and 213 are input to, for example, a computer (not illustrated). The computer is capable of generating an observation image, displaying the generated observation image, storing data on the observation image, based on the input electronic signals.

<Cemented Lens>

Figure 4:
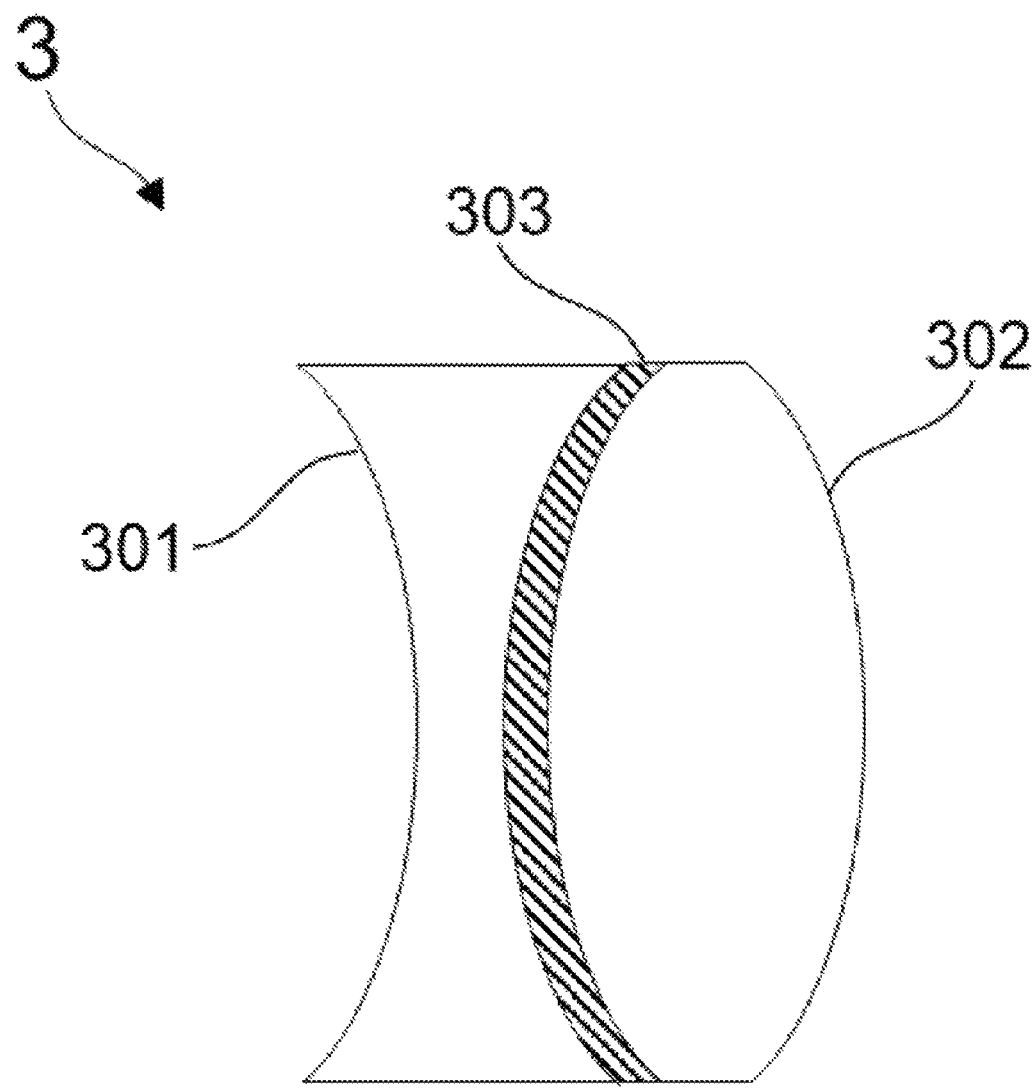
FIG. 4 is a schematic diagram illustrating an exemplary cemented lens according to the present embodiment.

FIG. 4 is a schematic diagram illustrating an exemplary cemented lens according to the present embodiment. The cemented lens 3 is a combinational lens having a first lens element 301 and a second lens element 302. At least one of the first lens element and the second lens element is formed using the optical glass according to the present embodiment. The first lens element and the second lens element are bonded by interposing a bonding member 303. As the bonding member 303, an adhesive or the like known in the art may be used. Note that, in some cases, the lens included in the cemented lens may be referred to as a "lens element" as described above from the viewpoint of clarifying that the lens is an element of the cemented lens.

The cemented lens according to the present embodiment is useful from the viewpoint of chromatic aberration correction, and can be suitably used in the optical element, the optical system, the optical device, or the like as described above. In addition, an optical system including the cemented lens can be particularly suitably used in an interchangeable lens for camera, an optical device, or the like. Note that, although a cemented lens using two lens elements has been described in the aforementioned embodiment, the present invention may include a cemented lens using three or more lens elements without limiting thereto. In the case of the cemented lens using three or more lens elements, at least one of the three or more lens elements may be formed using the optical glass according to the present embodiment.

Examples

Next, Examples and Comparative Examples of the present invention will be described. Note that the present invention is not limited to these examples.

<Production of Optical Glass>

The optical glasses according to each example and each comparative example were produced in the following procedure. First, a glass material selected from oxides, hydroxides, phosphate compounds (such as phosphate or orthophosphoric acid), carbonates, nitrates, or the like was weighed to obtain the compositions (mass %) shown in each table. Then, the weighed raw materials were mixed, put into a platinum crucible, melted at a temperature of 1100 to 1300° C., and homogenized by stirring. After removing bubbles, the temperature was lowered to an appropriate level. Then, the molten materials were cast into a mold, gradually cooled, and molded to obtain each sample.

<Physical Property Evaluation>

Refractive Index ($n_d$) and Abbe Number ($v_d$)

The refractive indices ($n_d$) and the Abbe numbers ($v_d$) of each sample were measured and calculated using a refractometer (KPR-2000, manufactured by Shimadzu Device Corporation). "$n_d$" denotes a refractive index of the glass with respect to light having a wavelength of 587.562 nm. "$v_d$" was obtained from the following Equation (1). "$n_c$" and "$n_F$" denote the refractive indices of the glass with respect to light having wavelengths of 656.273 nm and 486.133 nm, respectively.

$$v_d = (n_d - 1)/(n_F - n_c) \tag{1}$$

Partial Dispersion Ratio ($P_{g,F}$)

The partial dispersion ratio ($P_{g,F}$) of each sample indicates a ratio of the partial dispersion ($n_g - n_F$) with respect to the main dispersion ($n_F - n_c$), and was obtained from the following Equation (2). "$n_g$" denotes a refractive index of the glass with respect to light having a wavelength of 435.835 nm. The value of the partial dispersion ratio ($P_{g,F}$) was set to four decimal places.

$$(P_{g,F}) = (n_g - n_F)/(n_F - n_c) \tag{2}$$

Specific Gravity ($S_g$)

The specific gravity ($S_g$) of each sample was determined from the mass ratio with respect to the same volume of pure water at a temperature of 4° C.

Tables 1 to 11 show the compositions and the evaluation results of the physical properties for the optical glasses of each of the examples and comparative examples on the basis of the mass % of each component with respect to the oxide. "$\Sigma R_2O$" in the equation denotes a total amount of $Li_2O$, $Na_2O$, and $K_2O$ (where R=Li, Na, or K). In Comparative Example 2, since the optical glass was not obtainable, the physical property was set to "unmeasurable".

TABLE 1

| Example No. | 1 | 2 | 3 | 4 | 5 | 6 |
|---|---|---|---|---|---|---|
| $P_2O_5$ | 37.64 | 36.78 | 36.76 | 35.75 | 44.14 | 45.25 |
| $SiO_2$ | 0.00 | 0.00 | 0.00 | 0.00 | 0.00 | 0.00 |
| $B_2O_3$ | 4.44 | 4.34 | 6.50 | 8.43 | 0.00 | 0.00 |
| $Li_2O$ | 0.00 | 0.00 | 0.00 | 0.00 | 0.00 | 0.00 |
| $Na_2O$ | 17.32 | 16.93 | 16.92 | 16.45 | 16.37 | 17.42 |
| $K_2O$ | 7.81 | 7.63 | 7.63 | 7.42 | 7.39 | 7.57 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 5.78 | 5.65 | 5.65 | 5.49 | 7.00 | 4.02 |
| ZnO | 1.57 | 1.53 | 1.53 | 1.49 | 2.30 | 2.36 |
| $Al_2O_3$ | 4.90 | 6.90 | 4.78 | 4.65 | 2.58 | 2.65 |
| $TiO_2$ | 20.42 | 20.12 | 20.11 | 20.20 | 20.11 | 20.61 |
| $ZrO_2$ | 0.00 | 0.00 | 0.00 | 0.00 | 0.00 | 0.00 |

TABLE 1-continued

| Example No. | 1 | 2 | 3 | 4 | 5 | 6 |
|---|---|---|---|---|---|---|
| $Nb_2O_5$ | 0.00 | 0.00 | 0.00 | 0.00 | 0.00 | 0.00 |
| $Sb_2O_3$ | 0.12 | 0.12 | 0.12 | 0.12 | 0.12 | 0.12 |
| $Ta_2O_5$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $La_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $WO_3$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| total | 100.00 | 100.00 | 100.00 | 100.00 | 100.00 | 100.00 |
| $\Sigma R_2O$ | 25.13 | 24.56 | 24.55 | 23.87 | 23.76 | 25.00 |
| $TiO_2/P_2O_5$ | 0.54 | 0.55 | 0.55 | 0.57 | 0.46 | 0.46 |
| $TiO_2/Al_2O_3$ | 4.17 | 2.91 | 4.20 | 4.34 | 7.79 | 7.79 |
| $n_d$ | 1.64597 | 1.64201 | 1.64412 | 1.64523 | 1.67082 | 1.66678 |
| $v_d$ | 30.86 | 31.50 | 31.08 | 30.96 | 26.77 | 26.54 |
| $P_{g,F}$ | 0.6151 | 0.6121 | 0.6150 | 0.6158 | 0.6347 | 0.6345 |
| $S_g$ | 2.90 | 2.87 | 2.88 | 2.86 | 2.95 | 2.90 |

TABLE 2

| Example No. | 7 | 8 | 9 | 10 | 11 | 12 |
|---|---|---|---|---|---|---|
| $P_2O_5$ | 45.83 | 45.65 | 44.78 | 43.56 | 44.34 | 45.22 |
| $SiO_2$ | 0.00 | 0.00 | 0.00 | 0.00 | 0.00 | 0.00 |
| $B_2O_3$ | 0.00 | 0.00 | 0.00 | 0.00 | 0.00 | 0.00 |
| $Li_2O$ | 0.00 | 0.00 | 0.00 | 0.00 | 0.00 | 0.92 |
| $Na_2O$ | 16.36 | 15.67 | 17.24 | 14.93 | 15.20 | 15.50 |
| $K_2O$ | 7.67 | 7.64 | 7.49 | 7.29 | 10.27 | 7.57 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 4.07 | 4.06 | 3.98 | 8.43 | 3.94 | 4.02 |
| ZnO | 2.39 | 2.38 | 2.33 | 2.27 | 2.31 | 2.35 |
| $Al_2O_3$ | 2.68 | 3.70 | 3.66 | 3.56 | 3.62 | 3.69 |
| $TiO_2$ | 20.88 | 20.80 | 20.40 | 19.84 | 20.20 | 20.60 |
| $ZrO_2$ | 0.00 | 0.00 | 0.00 | 0.00 | 0.00 | 0.00 |
| $Nb_2O_5$ | 0.00 | 0.00 | 0.00 | 0.00 | 0.00 | 0.00 |
| $Sb_2O_3$ | 0.12 | 0.12 | 0.12 | 0.12 | 0.12 | 0.12 |
| $Ta_2O_5$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $La_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $WO_3$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| total | 100.00 | 100.00 | 100.00 | 100.00 | 100.00 | 100.00 |
| $\Sigma R_2O$ | 24.03 | 23.30 | 24.74 | 22.22 | 25.47 | 23.99 |
| $TiO_2/P_2O_5$ | 0.46 | 0.46 | 0.46 | 0.46 | 0.46 | 0.46 |
| $TiO_2/Al_2O_3$ | 7.79 | 5.63 | 5.58 | 5.58 | 5.58 | 5.58 |
| $n_d$ | 1.67107 | 1.66960 | 1.66487 | 1.67372 | 1.66370 | 1.67298 |
| $v_d$ | 26.23 | 26.63 | 26.96 | 27.03 | 26.84 | 26.62 |
| $P_{g,F}$ | 0.6360 | 0.6335 | 0.6326 | 0.6325 | 0.6343 | 0.6339 |
| $S_g$ | 2.90 | 2.90 | 2.91 | 2.99 | 2.89 | 2.92 |

TABLE 3

| Example No. | 13 | 14 | 15 | 16 | 17 | 18 |
|---|---|---|---|---|---|---|
| $P_2O_5$ | 42.62 | 43.88 | 45.34 | 42.67 | 43.84 | 40.47 |
| $SiO_2$ | 0.00 | 0.00 | 0.00 | 0.00 | 0.00 | 0.00 |
| $B_2O_3$ | 0.00 | 0.00 | 0.00 | 0.00 | 0.00 | 2.13 |
| $Li_2O$ | 0.00 | 0.00 | 1.54 | 0.00 | 0.00 | 0.00 |
| $Na_2O$ | 12.80 | 13.18 | 13.62 | 13.42 | 11.93 | 12.20 |
| $K_2O$ | 7.13 | 12.05 | 7.59 | 7.14 | 10.16 | 10.38 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 11.23 | 3.90 | 4.03 | 9.75 | 3.90 | 3.98 |
| ZnO | 2.22 | 2.28 | 2.36 | 2.22 | 6.34 | 6.48 |

TABLE 3-continued

| Example No. | 13 | 14 | 15 | 16 | 17 | 18 |
|---|---|---|---|---|---|---|
| $Al_2O_3$ | 4.47 | 4.60 | 4.76 | 4.48 | 3.58 | 3.66 |
| $TiO_2$ | 19.42 | 19.99 | 20.65 | 20.21 | 20.13 | 20.58 |
| $ZrO_2$ | 0.00 | 0.00 | 0.00 | 0.00 | 0.00 | 0.00 |
| $Nb_2O_5$ | 0.00 | 0.00 | 0.00 | 0.00 | 0.00 | 0.00 |
| $Sb_2O_3$ | 0.11 | 0.12 | 0.12 | 0.11 | 0.12 | 0.12 |
| $Ta_2O_5$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $La_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $WO_3$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| total | 100.00 | 100.00 | 100.00 | 100.00 | 100.00 | 100.00 |
| $\Sigma R_2O$ | 19.94 | 25.23 | 22.75 | 20.56 | 22.09 | 22.58 |
| $TiO_2/P_2O_5$ | 0.46 | 0.46 | 0.46 | 0.47 | 0.46 | 0.51 |
| $TiO_2/Al_2O_3$ | 4.34 | 4.34 | 4.34 | 4.52 | 5.62 | 5.62 |
| $n_d$ | 1.67420 | 1.66024 | 1.67541 | 1.67905 | 1.67594 | 1.66859 |
| $v_d$ | 27.81 | 27.30 | 26.93 | 27.18 | 26.54 | 28.35 |
| $P_{g,F}$ | 0.6307 | 0.6329 | 0.6328 | 0.6305 | 0.6331 | 0.6267 |
| $S_g$ | 3.02 | 2.89 | 2.91 | 3.02 | 2.96 | 2.95 |

TABLE 4

| Example No. | 19 | 20 | 21 | 22 | 23 | 24 |
|---|---|---|---|---|---|---|
| $P_2O_5$ | 45.28 | 45.67 | 44.97 | 45.39 | 45.01 | 42.96 |
| $SiO_2$ | 0.00 | 0.00 | 0.00 | 0.00 | 0.00 | 0.00 |
| $B_2O_3$ | 0.00 | 0.00 | 0.00 | 0.00 | 0.00 | 0.00 |
| $Li_2O$ | 2.55 | 2.57 | 3.18 | 2.51 | 2.53 | 2.11 |
| $Na_2O$ | 17.36 | 18.84 | 17.85 | 18.73 | 15.94 | 13.34 |
| $K_2O$ | 7.83 | 7.90 | 9.05 | 6.86 | 10.78 | 7.43 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 4.16 | 4.19 | 5.92 | 8.77 | 4.13 | 11.69 |
| ZnO | 2.44 | 2.46 | 1.62 | 0.00 | 2.42 | 2.31 |
| $Al_2O_3$ | 4.91 | 2.76 | 2.20 | 2.14 | 3.80 | 4.66 |
| $TiO_2$ | 15.36 | 15.49 | 15.08 | 15.48 | 15.27 | 15.38 |
| $ZrO_2$ | 0.00 | 0.00 | 0.00 | 0.00 | 0.00 | 0.00 |
| $Nb_2O_5$ | 0.00 | 0.00 | 0.00 | 0.00 | 0.00 | 0.00 |
| $Sb_2O_3$ | 0.12 | 0.13 | 0.13 | 0.12 | 0.12 | 0.12 |
| $Ta_2O_5$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $La_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $WO_3$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| total | 100.00 | 100.00 | 100.00 | 100.00 | 100.00 | 100.00 |
| $\Sigma R_2O$ | 27.73 | 29.30 | 30.08 | 28.09 | 29.25 | 22.88 |
| $TiO_2/P_2O_5$ | 0.34 | 0.34 | 0.34 | 0.34 | 0.34 | 0.36 |
| $TiO_2/Al_2O_3$ | 3.13 | 5.61 | 6.87 | 7.22 | 4.02 | 3.30 |
| $n_d$ | 1.62513 | 1.62585 | 1.62052 | 1.63020 | 1.62426 | 1.64479 |
| $v_d$ | 32.03 | 31.07 | 32.04 | 30.96 | 31.38 | 31.59 |
| $P_{g,F}$ | 0.6188 | 0.6213 | 0.6191 | 0.6223 | 0.6227 | 0.6211 |
| $S_g$ | 2.85 | 2.84 | 2.84 | 2.89 | 2.83 | 3.00 |

TABLE 5

| Example No. | 25 | 26 | 27 | 28 | 29 | 30 |
|---|---|---|---|---|---|---|
| $P_2O_5$ | 44.93 | 43.69 | 45.04 | 44.73 | 44.50 | 47.75 |
| $SiO_2$ | 0.00 | 0.00 | 0.00 | 0.00 | 0.00 | 0.00 |
| $B_2O_3$ | 0.00 | 0.00 | 0.00 | 0.00 | 0.00 | 0.00 |
| $Li_2O$ | 1.26 | 0.00 | 0.00 | 0.00 | 0.00 | 3.74 |
| $Na_2O$ | 20.85 | 16.82 | 16.74 | 17.86 | 17.14 | 10.73 |
| $K_2O$ | 8.52 | 7.31 | 8.49 | 6.54 | 7.45 | 7.99 |
| MgO | 0.00 | 0.00 | 0.00 | 0.00 | 0.00 | 0.00 |
| CaO | 0.00 | 0.00 | 0.00 | 0.00 | 0.00 | 0.00 |

TABLE 5-continued

| Example No. | 25 | 26 | 27 | 28 | 29 | 30 |
|---|---|---|---|---|---|---|
| SrO | 0.00 | 0.00 | 0.00 | 0.00 | 0.00 | 0.00 |
| BaO | 4.53 | 3.88 | 5.55 | 8.36 | 0.00 | 5.97 |
| ZnO | 2.65 | 2.27 | 1.52 | 0.00 | 4.42 | 1.57 |
| $Al_2O_3$ | 2.12 | 2.03 | 2.06 | 2.04 | 2.07 | 2.06 |
| $TiO_2$ | 15.03 | 23.88 | 20.52 | 20.37 | 24.32 | 20.07 |
| $ZrO_2$ | 0.00 | 0.00 | 0.00 | 0.00 | 0.00 | 0.00 |
| $Nb_2O_5$ | 0.00 | 0.00 | 0.00 | 0.00 | 0.00 | 0.00 |
| $Sb_2O_3$ | 0.12 | 0.12 | 0.09 | 0.09 | 0.12 | 0.13 |
| $Ta_2O_5$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $La_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $WO_3$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| total | 100.00 | 100.00 | 100.00 | 100.00 | 100.00 | 100.00 |
| $\Sigma R_2O$ | 30.63 | 24.13 | 25.22 | 24.40 | 24.58 | 22.45 |
| $TiO_2/P_2O_5$ | 0.33 | 0.55 | 0.46 | 0.46 | 0.55 | 0.42 |
| $TiO_2/Al_2O_3$ | 7.10 | 11.77 | 9.96 | 9.96 | 11.77 | 9.72 |
| $n_d$ | 1.61405 | 1.68885 | 1.66809 | 1.66716 | 1.68737 | 1.68416 |
| $v_d$ | 32.01 | 25.17 | 26.32 | 26.75 | 25.02 | 26.19 |
| $P_{g,F}$ | 0.6184 | 0.6385 | 0.6368 | 0.6327 | 0.6382 | 0.6352 |
| $S_g$ | 2.84 | 2.92 | 2.91 | 2.94 | 2.89 | 2.91 |

TABLE 6

| Example No. | 31 | 32 | 33 | 34 | 35 | 36 |
|---|---|---|---|---|---|---|
| $P_2O_5$ | 44.48 | 47.09 | 45.09 | 47.66 | 48.93 | 41.81 |
| $SiO_2$ | 0.00 | 0.00 | 0.00 | 0.00 | 0.00 | 0.00 |
| $B_2O_3$ | 0.00 | 0.00 | 0.00 | 0.00 | 0.00 | 0.00 |
| $Li_2O$ | 0.00 | 3.04 | 2.91 | 0.00 | 0.00 | 0.00 |
| $Na_2O$ | 22.05 | 18.13 | 17.36 | 14.40 | 14.78 | 15.54 |
| $K_2O$ | 0.00 | 3.69 | 3.53 | 8.98 | 9.22 | 7.88 |
| MgO | 0.00 | 0.00 | 0.00 | 0.00 | 6.83 | 0.00 |
| CaO | 0.00 | 0.00 | 0.00 | 9.25 | 0.00 | 0.00 |
| SrO | 0.00 | 0.00 | 0.00 | 0.00 | 0.00 | 0.00 |
| BaO | 5.56 | 0.00 | 0.00 | 0.00 | 0.00 | 5.15 |
| ZnO | 1.46 | 0.00 | 0.00 | 0.00 | 0.00 | 1.41 |
| $Al_2O_3$ | 2.03 | 2.19 | 2.09 | 2.18 | 2.24 | 9.08 |
| $TiO_2$ | 24.31 | 25.73 | 28.88 | 17.44 | 17.91 | 19.05 |
| $ZrO_2$ | 0.00 | 0.00 | 0.00 | 0.00 | 0.00 | 0.00 |
| $Nb_2O_5$ | 0.00 | 0.00 | 0.00 | 0.00 | 0.00 | 0.00 |
| $Sb_2O_3$ | 0.12 | 0.12 | 0.12 | 0.10 | 0.10 | 0.08 |
| $Ta_2O_5$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $La_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $WO_3$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| total | 100.00 | 100.00 | 100.00 | 100.00 | 100.00 | 100.00 |
| $\Sigma R_2O$ | 22.05 | 24.87 | 23.81 | 23.38 | 24.00 | 23.42 |
| $TiO_2/P_2O_5$ | 0.55 | 0.55 | 0.64 | 0.37 | 0.37 | 0.46 |
| $TiO_2/Al_2O_3$ | 11.97 | 11.77 | 13.80 | 8.01 | 8.01 | 2.10 |
| $n_d$ | 1.68906 | 1.69825 | 1.71542 | 1.64397 | 1.64189 | 1.63307 |
| $v_d$ | 25.69 | 24.62 | 24.00 | 30.09 | 29.06 | 32.89 |
| $P_{g,F}$ | 0.6336 | 0.6400 | 0.6409 | 0.6250 | 0.6270 | 0.6069 |
| $S_g$ | 2.96 | 2.83 | 2.87 | 2.83 | 2.79 | 2.88 |

TABLE 7

| Example No. | 37 | 38 | 39 | 40 | 41 | 42 |
|---|---|---|---|---|---|---|
| $P_2O_5$ | 43.20 | 44.63 | 44.02 | 44.69 | 45.15 | 41.84 |
| $SiO_2$ | 0.00 | 0.00 | 0.00 | 0.00 | 0.00 | 0.00 |
| $B_2O_3$ | 0.00 | 0.00 | 0.00 | 0.00 | 0.00 | 6.17 |
| $Li_2O$ | 1.21 | 2.58 | 1.24 | 1.26 | 1.27 | 2.35 |
| $Na_2O$ | 20.04 | 0.00 | 14.38 | 12.63 | 14.74 | 14.82 |

TABLE 7-continued

| Example No. | 37 | 38 | 39 | 40 | 41 | 42 |
|---|---|---|---|---|---|---|
| $K_2O$ | 8.19 | 19.71 | 7.37 | 10.45 | 7.55 | 10.02 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 4.35 | 11.76 | 0.00 | 0.00 | 0.00 | 3.84 |
| ZnO | 5.85 | 2.32 | 0.00 | 0.00 | 0.00 | 2.25 |
| $Al_2O_3$ | 2.04 | 2.61 | 2.04 | 2.07 | 2.10 | 3.53 |
| $TiO_2$ | 15.01 | 16.27 | 30.83 | 28.77 | 29.07 | 15.06 |
| $ZrO_2$ | 0.00 | 0.00 | 0.00 | 0.00 | 0.00 | 0.00 |
| $Nb_2O_5$ | 0.00 | 0.00 | 0.00 | 0.00 | 0.00 | 0.00 |
| $Sb_2O_3$ | 0.12 | 0.12 | 0.12 | 0.12 | 0.12 | 0.11 |
| $Ta_2O_5$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $La_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $WO_3$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| total | 100.00 | 100.00 | 100.00 | 100.00 | 100.00 | 100.00 |
| $\Sigma R_2O$ | 29.44 | 22.29 | 22.98 | 24.35 | 23.57 | 27.19 |
| $TiO_2/P_2O_5$ | 0.35 | 0.36 | 0.70 | 0.64 | 0.64 | 0.36 |
| $TiO_2/Al_2O_3$ | 7.37 | 6.24 | 15.09 | 13.87 | 13.87 | 4.26 |
| $n_d$ | 1.61689 | 1.65792 | 1.73535 | 1.72422 | 1.72390 | 1.62082 |
| $v_d$ | 32.62 | 28.53 | 22.43 | 22.58 | 22.82 | 33.72 |
| $P_{g,F}$ | 0.6119 | 0.6318 | 0.6477 | 0.6481 | 0.6457 | 0.6103 |
| $S_g$ | 2.88 | 2.95 | 2.89 | 2.86 | 2.87 | 2.82 |

TABLE 8

| Example No. | 43 | 44 | 45 | 46 | 47 | 48 |
|---|---|---|---|---|---|---|
| $P_2O_5$ | 40.13 | 38.26 | 46.48 | 45.56 | 44.18 | 40.95 |
| $SiO_2$ | 0.00 | 0.00 | 0.00 | 0.00 | 0.00 | 0.00 |
| $B_2O_3$ | 5.92 | 5.64 | 0.00 | 0.00 | 0.00 | 0.00 |
| $Li_2O$ | 1.97 | 0.00 | 3.01 | 2.95 | 0.00 | 0.00 |
| $Na_2O$ | 12.46 | 11.88 | 11.02 | 7.00 | 13.35 | 12.37 |
| $K_2O$ | 6.94 | 12.55 | 8.76 | 14.36 | 8.33 | 7.72 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 15.84 | 0.00 |
| BaO | 10.92 | 10.41 | 5.73 | 5.62 | 0.00 | 21.73 |
| ZnO | 2.16 | 2.06 | 1.57 | 1.54 | 0.00 | 0.00 |
| $Al_2O_3$ | 4.35 | 4.15 | 2.13 | 2.08 | 2.02 | 2.06 |
| $TiO_2$ | 15.04 | 15.06 | 21.17 | 20.76 | 16.17 | 15.06 |
| $ZrO_2$ | 0.00 | 0.00 | 0.00 | 0.00 | 0.00 | 0.00 |
| $Nb_2O_5$ | 0.00 | 0.00 | 0.00 | 0.00 | 0.00 | 0.00 |
| $Sb_2O_3$ | 0.11 | 0.00 | 0.12 | 0.12 | 0.12 | 0.11 |
| $Ta_2O_5$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $La_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $WO_3$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| total | 100.00 | 100.00 | 100.00 | 100.00 | 100.00 | 100.00 |
| $\Sigma R_2O$ | 21.37 | 24.43 | 22.79 | 24.32 | 21.67 | 20.09 |
| $TiO_2/P_2O_5$ | 0.37 | 0.39 | 0.46 | 0.46 | 0.37 | 0.37 |
| $TiO_2/Al_2O_3$ | 3.46 | 3.63 | 9.96 | 9.96 | 8.01 | 7.31 |
| $n_d$ | 1.63764 | 1.62521 | 1.69284 | 1.68546 | 1.64640 | 1.65593 |
| $v_d$ | 33.97 | 33.56 | 25.38 | 25.52 | 30.38 | 30.27 |
| $P_{g,F}$ | 0.6105 | 0.6123 | 0.6374 | 0.6397 | 0.6248 | 0.6240 |
| $S_g$ | 2.97 | 2.92 | 2.93 | 2.91 | 3.00 | 3.16 |

TABLE 9

| Example No. | 49 | 50 | 51 | 52 | 53 | 54 |
|---|---|---|---|---|---|---|
| $P_2O_5$ | 45.73 | 41.80 | 39.90 | 39.02 | 42.72 | 32.87 |
| $SiO_2$ | 0.00 | 0.00 | 0.00 | 0.00 | 2.42 | 0.00 |
| $B_2O_3$ | 0.00 | 1.03 | 0.91 | 0.00 | 2.10 | 6.48 |
| $Li_2O$ | 0.00 | 2.35 | 2.24 | 0.00 | 2.40 | 0.00 |
| $Na_2O$ | 13.82 | 14.81 | 14.13 | 15.03 | 15.13 | 15.12 |
| $K_2O$ | 8.62 | 10.01 | 9.55 | 6.53 | 10.23 | 6.82 |
| $MgO$ | 0.00 | 0.00 | 0.00 | 0.00 | 0.00 | 0.00 |
| $CaO$ | 0.00 | 0.00 | 0.00 | 0.00 | 0.00 | 0.00 |
| $SrO$ | 0.00 | 0.00 | 0.00 | 0.00 | 0.00 | 0.00 |
| $BaO$ | 0.00 | 3.84 | 3.66 | 0.00 | 3.92 | 5.05 |
| $ZnO$ | 12.88 | 2.25 | 2.15 | 0.00 | 2.30 | 1.37 |
| $Al_2O_3$ | 2.09 | 2.02 | 2.03 | 2.01 | 3.61 | 4.28 |
| $TiO_2$ | 16.74 | 15.12 | 15.11 | 25.13 | 15.05 | 13.20 |
| $ZrO_2$ | 0.00 | 0.00 | 0.00 | 0.00 | 0.00 | 0.00 |
| $Nb_2O_5$ | 0.00 | 0.00 | 0.00 | 0.00 | 0.00 | 4.79 |
| $Sb_2O_3$ | 0.12 | 0.11 | 0.11 | 0.10 | 0.12 | 0.11 |
| $Ta_2O_5$ | 0.00 | 0.00 | 0.00 | 12.19 | 0.00 | 0.00 |
| $Y_2O_3$ | 0.00 | 6.66 | 0.00 | 0.00 | 0.00 | 0.00 |
| $La_2O_3$ | 0.00 | 0.00 | 0.00 | 0.00 | 0.00 | 0.00 |
| $Gd_2O_3$ | 0.00 | 0.00 | 10.21 | 0.00 | 0.00 | 0.00 |
| $WO_3$ | 0.00 | 0.00 | 0.00 | 0.00 | 0.00 | 5.06 |
| $Bi_2O_3$ | 0.00 | 0.00 | 0.00 | 0.00 | 0.00 | 4.86 |
| total | 100.00 | 100.00 | 100.00 | 100.00 | 100.00 | 100.00 |
| $\Sigma R_2O$ | 22.44 | 27.16 | 25.93 | 21.56 | 27.76 | 21.95 |
| $TiO_2/P_2O_5$ | 0.37 | 0.36 | 0.38 | 0.64 | 0.35 | 0.40 |
| $TiO_2/Al_2O_3$ | 8.01 | 7.47 | 7.45 | 12.51 | 4.17 | 3.09 |
| $n_d$ | 1.65373 | 1.63363 | 1.63882 | 1.72273 | 1.62134 | 1.65072 |
| $v_d$ | 28.34 | 33.39 | 33.59 | 24.06 | 32.69 | 31.74 |
| $P_{g,F}$ | 0.6287 | 0.6093 | 0.6096 | 0.6236 | 0.6141 | 0.6039 |
| $S_g$ | 2.95 | 2.93 | 3.06 | 3.08 | 2.82 | 3.07 |

TABLE 10

| Example No. | 55 | 56 | 57 |
|---|---|---|---|
| $P_2O_5$ | 39.80 | 43.73 | 44.661 |
| $SiO_2$ | 0.00 | 0.00 | 0.00 |
| $B_2O_3$ | 0.00 | 1.07 | 1.10 |
| $Li_2O$ | 1.12 | 2.46 | 2.51 |
| $Na_2O$ | 13.00 | 15.49 | 15.82 |
| $K_2O$ | 6.66 | 10.47 | 10.69 |
| $MgO$ | 0.00 | 0.00 | 0.00 |
| $CaO$ | 0.00 | 0.00 | 0.00 |
| $SrO$ | 0.00 | 0.00 | 0.00 |
| $BaO$ | 0.00 | 4.02 | 4.10 |
| $ZnO$ | 0.00 | 2.35 | 2.40 |
| $Al_2O_3$ | 2.04 | 2.12 | 2.16 |
| $TiO_2$ | 26.38 | 14.83 | 15.15 |
| $ZrO_2$ | 0.00 | 0.00 | 1.29 |
| $Nb_2O_5$ | 0.00 | 0.00 | 0.00 |
| $Sb_2O_3$ | 0.11 | 0.12 | 0.12 |
| $Ta_2O_5$ | 0.00 | 0.00 | 0.00 |
| $Y_2O_3$ | 0.00 | 0.00 | 0.00 |
| $La_2O_3$ | 0.00 | 3.35 | 0.00 |
| $Gd_2O_3$ | 0.00 | 0.00 | 0.00 |
| $WO_3$ | 6.52 | 0.00 | 0.00 |
| $Bi_2O_3$ | 4.37 | 0.00 | 0.00 |
| total | 100.00 | 100.00 | 100.00 |
| $\Sigma R_2O$ | 20.78 | 28.41 | 29.02 |
| $TiO_2/P_2O_5$ | 0.66 | 0.34 | 0.34 |
| $TiO_2/Al_2O_3$ | 12.94 | 7.00 | 7.00 |
| $n_d$ | 1.74460 | 1.62964 | 1.62841 |
| $v_d$ | 22.65 | 31.84 | 31.40 |
| $P_{g,F}$ | 0.6454 | 0.6185 | 0.6194 |
| $S_g$ | 3.09 | 2.90 | 2.85 |

TABLE 11

| Comparative Example No. | 1 | 2 |
|---|---|---|
| $P_2O_5$ | 27.17 | 37.20 |
| $SiO_2$ | 0.00 | 0.00 |
| $B_2O_3$ | 5.35 | 0.00 |
| $Li_2O$ | 0.00 | 2.40 |
| $Na_2O$ | 12.50 | 14.32 |
| $K_2O$ | 5.64 | 2.92 |
| $MgO$ | 0.00 | 0.00 |
| $CaO$ | 0.00 | 0.00 |
| $SrO$ | 0.00 | 0.00 |
| $BaO$ | 4.17 | 0.00 |
| $ZnO$ | 1.13 | 0.00 |
| $Al_2O_3$ | 3.54 | 1.73 |
| $TiO_2$ | 7.10 | 41.33 |
| $ZrO_2$ | 0.00 | 0.00 |
| $Nb_2O_5$ | 3.96 | 0.00 |
| $Sb_2O_3$ | 0.09 | 0.10 |
| $Ta_2O_5$ | 21.14 | 0.00 |
| $Y_2O_3$ | 0.00 | 0.00 |
| $La_2O_3$ | 0.00 | 0.00 |
| $Gd_2O_3$ | 0.00 | 0.00 |
| $WO_3$ | 4.18 | 0.00 |
| $Bi_2O_3$ | 4.02 | 0.00 |
| total | 100.00 | 100.00 |
| $\Sigma R_2O$ | 18.15 | 19.64 |
| $TiO_2/P_2O_5$ | 0.26 | 1.11 |
| $TiO_2/Al_2O_3$ | 2.01 | 23.94 |
| $n_d$ | 1.67449 | Unmeasurable |
| $v_d$ | 32.00 | Unmeasurable |
| $P_{g,F}$ | 0.5990 | Unmeasurable |
| $S_g$ | 3.48 | Unmeasurable |

From the aforementioned examples, it was recognized that the optical glass according to the present example has a low specific gravity while having a high dispersibility. In addition, it was recognized that coloring is suppressed, and excellent transmittance is obtained in the optical glass according to the present example.

1 imaging device,
101 camera body,
102 lens barrel,
103 lens,
104 sensor chip,
105 glass substrate,
106 multi-chip module,
CAM imaging device (non-lens-interchangeable camera),
WL photographing lens,
M liquid crystal monitor,
EF auxiliary light-emitting unit,
B1 release button,
B2 function button,
2 multi-photon microscope,
201 pulse laser device,
202 pulse division device,
203 beam adjustment unit,
204, 205, 212 dichroic mirror,
206 objective lens,
207, 211, 213 fluorescence detection unit,
208 condensing lens,
209 pin hole,
210 image forming lens,
S sample,
3 cemented lens,
301 first lens element,
302 second lens element,
303 bonding member

What is claimed is:

1. An optical glass comprising:
   $P_2O_5$ of 30 to 60 mass % (exclusive of 30);
   $Al_2O_3$ of 2 to 10 mass % (exclusive of 2);
   $TiO_2$ of 10 to 36 mass % (exclusive of 36);
   $Nb_2O_5$ of 0 to 5 mass %;
   in terms of mass %, a ratio of content of $TiO_2$ to content of $Al_2O_3$ ($TiO_2/Al_2O_3$) is 4.17 to
   in terms of mass %, a ratio of content of $TiO_2$ to content of $P_2O_5$ ($TiO_2/P_2O_5$) is 0.42 to 0.8; and
   a total amount of contents of $Li_2O$, $Na_2O$, and $K_2O$ ($Li_2O+Na_2O+K_2O$) is 10 to 35 mass %.

2. The optical glass according to claim 1, further comprising:
   $Li_2O$ of 0 to 20 mass %;
   $Na_2O$ of 0 to 30 mass %; and
   $K_2O$ of 0 to 30 mass %.

3. The optical glass according to claim 1, further comprising:
   $Nb_2O_5$ of 0 to 5 mass %;
   $Ta_2O_5$ of 0 to 15 mass %;
   $Bi_2O_3$ of 0 to 5 mass % (exclusive of 5); and
   $Sb_2O_3$ of 0 to 1 mass %.

4. The optical glass according to claim 1, further comprising:
   BaO of 0 to 20 mass %;
   ZnO of 0 to 20 mass %;
   MgO of 0 to 20 mass %;
   CaO of 0 to 20 mass %; and
   SrO of 0 to 20 mass %.

5. The optical glass according to claim 1, further comprising:
   $ZrO_2$ of 0 to 10 mass %;
   $Y_2O_3$ of 0 to 15 mass %;
   $La_2O_3$ of 0 to 10 mass %; and
   $Gd_2O_3$ of 0 to 20 mass %.

6. The optical glass according to claim 1, further comprising:
   $SiO_2$ of 0 to 10 mass %; and
   $B_2O_3$ of 0 to 20 mass %.

7. The optical glass according to claim 1, further comprising
   $WO_3$ of 0 to 15 mass %.

8. The optical glass according to claim 1, wherein tantalum, "Ta" is not substantially contained.

9. The optical glass according to claim 1, wherein a refractive index ($n_d$) with respect to a d-line has a range of 1.60 to 1.75.

10. The optical glass according to claim 1, wherein an Abbe number ($v_d$) has a range of 20 to 35.

11. The optical glass according to claim 1, wherein a specific gravity ($S_g$) is set to 2.9 to 3.6.

12. The optical glass according to claim 1, wherein a partial dispersion ratio ($P_{g,F}$) is set to 0.60 or higher.

13. An optical element comprising the optical glass according to claim 1.

14. An optical device comprising the optical element according to claim 13.

15. A cemented lens comprising a first lens element and a second lens element, wherein at least one of the first lens element and the second lens element includes the optical glass according to claim 1.

16. An optical system comprising the cemented lens according to claim 15.

17. An interchangeable lens for camera comprising the optical system according to claim 16.

18. An optical device comprising the optical system according to claim 16.

* * * * *

UNITED STATES PATENT AND TRADEMARK OFFICE
CERTIFICATE OF CORRECTION

| | | |
|---|---|---|
| PATENT NO. | : 12,234,183 B2 | Page 1 of 1 |
| APPLICATION NO. | : 18/213534 | |
| DATED | : February 25, 2025 | |
| INVENTOR(S) | : Tetsuya Koide | |

It is certified that error appears in the above-identified patent and that said Letters Patent is hereby corrected as shown below:

In the Claims

Column 21, Line 43:
In Claim 1, after "to" insert --16,--.

Signed and Sealed this
Thirteenth Day of May, 2025

Coke Morgan Stewart
*Acting Director of the United States Patent and Trademark Office*